(12) United States Patent
Ueda et al.

(10) Patent No.: US 7,011,901 B2
(45) Date of Patent: Mar. 14, 2006

(54) FUEL CELL GENERATION SYSTEM AND METHOD

(75) Inventors: Tetsuya Ueda, Kasugai (JP); Shinji Miyauchi, Nara (JP); Akinari Nakamura, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 632 days.

(21) Appl. No.: 10/085,567

(22) Filed: Feb. 27, 2002

(65) Prior Publication Data

US 2002/0127446 A1 Sep. 12, 2002

(30) Foreign Application Priority Data

Feb. 27, 2001 (JP) ........................................ 2001-051793

(51) Int. Cl.
H01M 8/06 (2006.01)

(52) U.S. Cl. ............................. 429/13; 429/17; 429/22; 429/26

(58) Field of Classification Search ................... 429/13, 429/12, 22, 23, 24, 25, 26, 17, 34
See application file for complete search history.

(56) References Cited

U.S. PATENT DOCUMENTS 6,532,792 B1 * 3/2003 Lloyd et al. ................. 73/23.2
6,682,841 B1 * 1/2004 Armstrong et al. ........... 429/26
2004/0072046 A1 * 4/2004 Schmidt ....................... 429/34

FOREIGN PATENT DOCUMENTS

JP 04-075263 3/1992
JP 05-290868 11/1993

OTHER PUBLICATIONS

European Search Report corresponding to application no. EP 02–00–4404 dated Jun. 2, 2005.

* cited by examiner

*Primary Examiner*—Michael Barr
*Assistant Examiner*—Monique Wills
(74) *Attorney, Agent, or Firm*—RatnerPrestia

(57) ABSTRACT

A fuel cell generation system, in which an interior of a package is partitioned into a gas path compartment and a non gas compartment with a partition wall, a component through which flammable gas flows is placed within the gas path compartment, a part of the frame member of the package constituting the gas path compartment is provided with gas path compartment inlets, a gas path compartment outlet and a ventilation fan, a component through which the flammable gas does not flows is placed within the non gas compartment, and a part of the frame member of the package of the non gas compartment is provided with a non gas compartment inlet, allowing a blower inlet to open into an interior of the non gas compartment and allowing an air outlet to open into an exterior of the package.

7 Claims, 3 Drawing Sheets

FUEL CELL GENERATION SYSTEM AND METHOD

BACKGROUND OF THE INVENTION

1. Field of the Invention

The present invention relates to a fuel cell generation system and method in which a fuel cell for generating electric power by reacting hydrogen with oxygen is installed within a package.

2. Related Art of the Invention

A conventional fuel cell generation system is disclosed in Japanese Patent Laid-Open No. 5-290868 and Japanese Patent Laid-Open No. 4-75263, for example.

The entire disclosure of these Japanese Patent Laid-Open No. 5-290868 and Japanese Patent Laid-Open No. 4-75263 is incorporated herein by reference in its entirety.

FIG. 2 shows a configuration from Japanese Patent Laid-Open No. 5-290868 as Conventional Example 1. In FIG. 2, reference numeral 51 denotes a package whose interior is partitioned into an electric apparatus compartment 53 and a high temperature apparatus compartment 54 with a partition wall 52. A control unit 55 is installed within the electric apparatus compartment 53, while a reformer 58 comprising a combustion fan 56 and a reformer outlet 57 as well as a fuel cell body 61 comprising an air blower 59 and a cell outlet 60 are installed within the high temperature apparatus compartment 54. Reference numeral 62 denotes a ventilating hole provided for the package 51 at the electric apparatus compartment 53, and reference numeral 63 denotes a vent allowing air to flow through the electric apparatus compartment 53 and the high temperature apparatus compartment 54.

In accordance with this configuration of Conventional Example 1, the fuel cell body 61 generates electric power by reacting hydrogen supplied from the reformer 58 with oxygen supplied from the air blower 59, where air for causing a reforming reaction supplied from the combustion fan 56 and the air blower 59 is sucked from the ventilating hole 62 through the electric apparatus compartment 53, the vent 63 and the high temperature apparatus compartment 54, then the control unit 55 is cooled by this circulating air. Exhaust gas obtained after the combustion in the reformer 58 is discharged from the reformer outlet 57 into the outside of the package 51 and exhaust gas obtained after the reaction in the fuel cell body 61 is discharged from the cell outlet 60 into the outside of the package 51.

FIG. 3 shows a configuration from Japanese Paten Laid-Open No. 4-75263 as Conventional Example 2. In FIG. 3, reference numeral 71 denotes a package comprising an upstream package compartment 72 and a downstream package compartment 73 which are coupled to each other through an airflow duct 74. A control unit 75 is installed within the upstream package compartment 72, while a reformer 77 comprising a combustion fan 76 and a fuel cell body 79 comprising an air blower 78 are installed within the downstream package compartment 73. Reference numeral 80 denotes a ventilation fan provided for the upstream package compartment 72 and reference numeral 81 denotes an outlet provided for the downstream package compartment 73.

In accordance with this configuration of Conventional Example 2, the fuel cell body 79 generates electric power by reacting hydrogen supplied from the reformer 77 with oxygen supplied from the air blower 78. Outside air supplied by the ventilation fan 80 flows through the upstream package compartment 72, the airflow duct 74, and the downstream package compartment 73 and is discharged from the outlet 81. The control unit 75 is cooled by such circulating air.

In the above described fuel cell generation system according to Conventional Example 1, in the event that flammable gas such as raw material gases and hydrogen leaks out of the reformer 58 or the fuel cell body 61, the leaked flammable gas is sucked into the reformer 58 by the combustion fan 56 or is sucked into the fuel cell body 61 by the air blower 59 and causes abnormal combustion inside the reformer 58 or inside the fuel cell body 61. In addition, a possibility of an explosion cannot be completely denied if the worst happens.

In the above described fuel cell generation system according to Conventional Example 2, even in the event that flammable gas such as raw material gases and hydrogen leaks out of the reformer 77 or the fuel cell body 79, the leaked flammable gas is discharged from the outlet 81 by the ventilation fan 80 so that its safety is secured. However, the ventilation fan 80 discharges air existing in whole space of the package and requires to have a substantially large capacity in order to cool the control unit 75. Thus the problem associated with this example is that the increased electric power consumption leads to a reduction in efficiency of the fuel cell generation system.

SUMMARY OF THE INVENTION

An object of the present invention, in consideration of such problems described above, is to provide a fuel cell generation system and method which secures its safety with a possibility of an explosion or abnormal combustion eliminated and reduces electric power required for the ventilation to maintain its high efficiency.

One aspect of the present invention is a fuel cell generation system comprising:

a first compartment and a second compartment provided by partitioning an interior of a package with a partition wall;

a reformer placed within said first compartment;

a fuel cell body placed within said first compartment;

a control unit for controlling said reformer and/or said fuel cell body, said control unit being placed within said second compartment; and an air blower for supplying air to said fuel cell body, said air blower being placed within said second compartment, wherein ventilation of said first compartment and ventilation of said second compartment are performed independently.

Another aspect of the present invention is the fuel cell generation system, wherein a predetermined part of a frame member of said package which constitutes an outer wall of said second compartment is provided with an inlet for said second compartment;

said frame member constituting said outer wall of said second compartment, other than said predetermined part where said inlet for said second compartment is provided, is provided with an air outlet for discharging exhaust gas from said fuel cell body to an outside of said package; and an inlet of said air blower opens into an interior of said second compartment.

Still another aspect of the present invention is the fuel cell generation system, wherein a predetermined part of a frame member of said package constituting an outer wall of said first compartment is provided with an inlet for said first compartment and an outlet for said first compartment, and said outlet for said first compartment is provided with a ventilation fan.

Yet still another aspect of the present invention is the fuel cell generation system, wherein said reformer and/or said fuel cell body are placed between said outlet for said first compartment and said inlet for said first compartment.

Still yet another aspect of the present invention is the fuel cell generation system, wherein said reformer is provided with a burner, and a frame member constituting an outer wall of said first compartment, other than said predetermined part, is provided with (1) an inlet for a combustion fan for supplying air for combustion to said burner and (2) an outlet for said reformer for discharging said combustion gas from said reformer.

A further aspect of the present invention is the fuel cell generation system, wherein a flammable gas detector for detecting flammable gas is provided in said vicinity of said ventilation fan.

DESCRIPTION OR SYMBOLS

Figure 1:
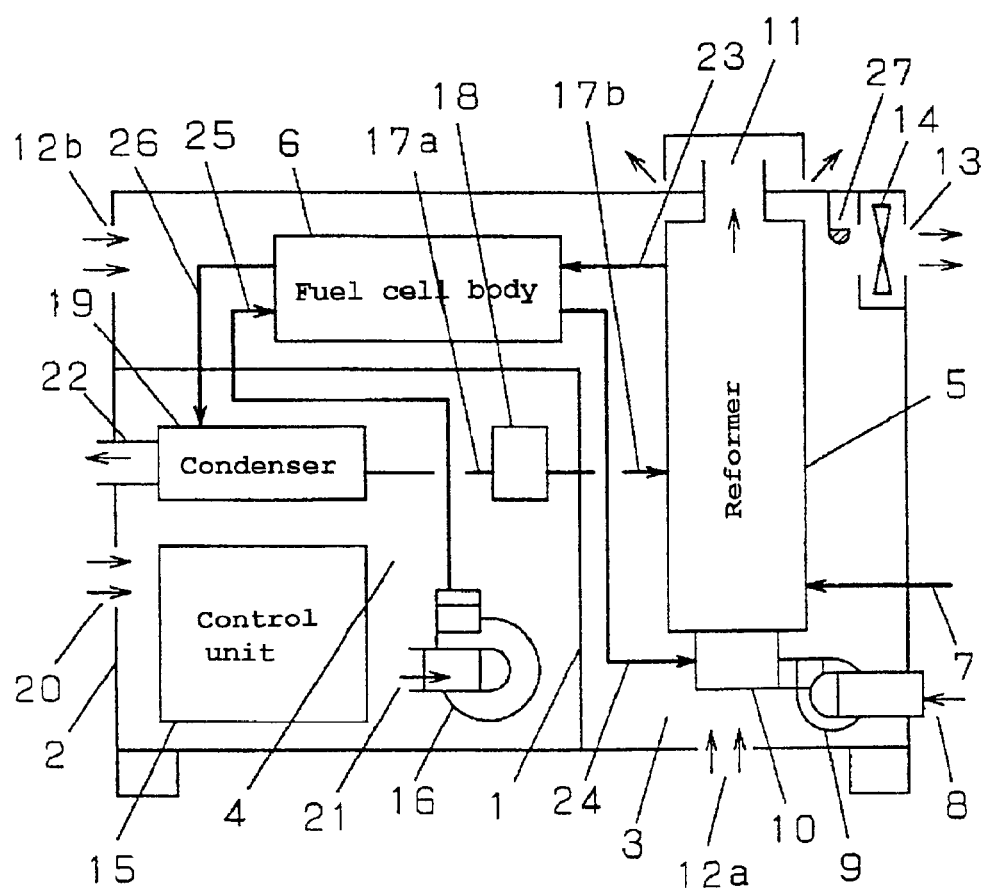
FIG. 1 is a block diagram showing a fuel cell generation stem according to Embodiments 1, 2, 3, and 4 of the present invention.
Figure 2:
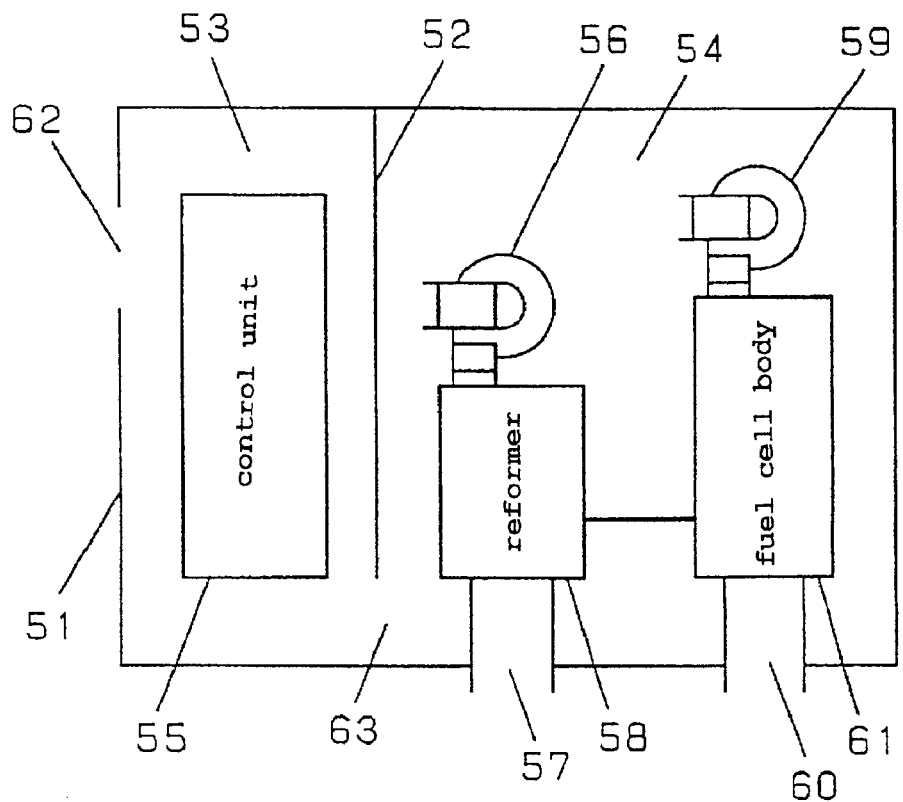
FIG. 2 is a block diagram showing a fuel cell generation stem according to Conventional Example 1.
Figure 3:
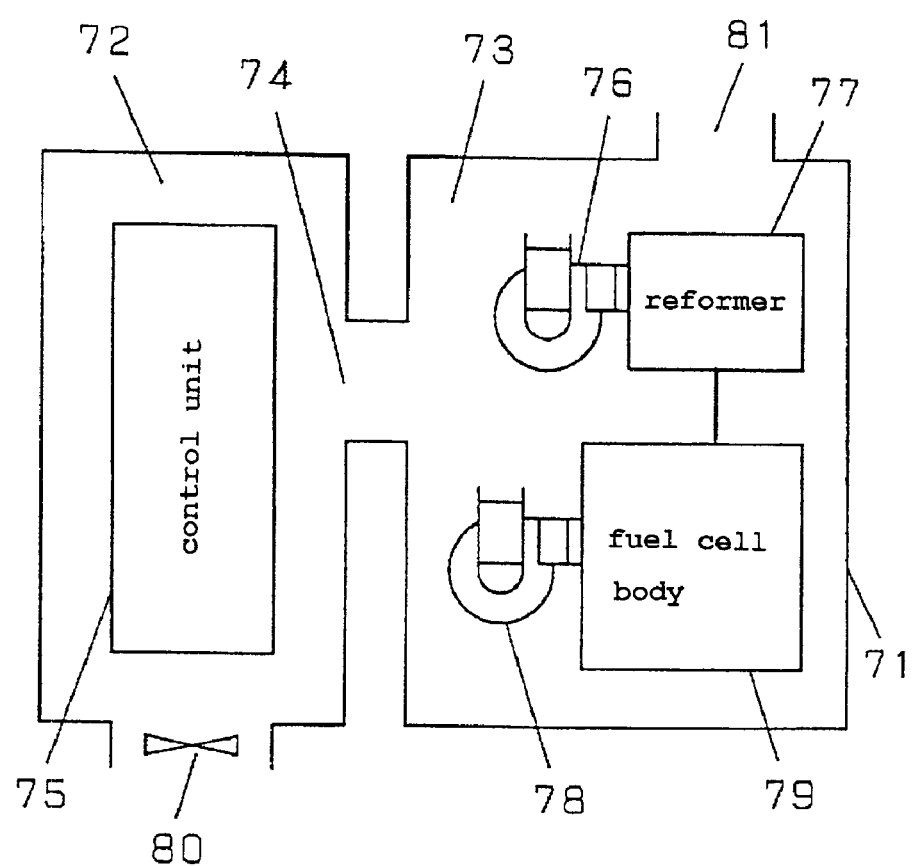
FIG. 3 is a block diagram showing a fuel cell generation stem according to Conventional Example 2.

1 Partition wall
2 Package
3 Gas path compartment
4 Non gas compartment
5 Reformer
6 Fuel cell body
8 Combustion fan inlet
10 Burner
11 Reformer outlet
12a Gas path compartment inlet
12b Gas path compartment inlet
13 Gas path compartment outlet
14 Ventilation fan
15 Control unit
16 Air blower
19 Condenser
20 Non gas compartment inlet
21 Blower inlet
22 Air outlet
27 Flammable gas detector

PREFERRED EMBODIMENTS OF THE INVENTION

Embodiments of a fuel cell generation system and method according to the present invention will be described below with reference to FIG. 1.

Embodiment 1

FIG. 1 is a block diagram showing a fuel cell generation system according to Embodiment 1 of the present invention.

In FIG. 1, reference numeral 1 denotes a partition wall for partitioning an interior of a package 2 into a gas path compartment 3 and a non gas compartment 4. Components through which flammable gases flow such as a reformer 5 and a fuel cell body 6 are positioned in a gas path compartment 3.

The reformer 5 is provided with raw material gas piping 7, a burner 10 fitted with a combustion inlet 8 and a combustion fan 9, and a reformer outlet 11. A predetermined part of the frame member of the package 2 which constitutes outer walls of the gas path compartment 3 is provided with gas path compartment inlets 12a, 12b, a gas path compartment outlet 13, and a ventilation fan 14.

Components such as a control unit 15, an air blower 16, and a condenser 19 connected through water piping 17a to a water supplying apparatus 18 are positioned in the non gas compartment 4. Flammable gases do not flow through these components.

A non gas compartment inlet 20 is provided for a predetermined part of the frame member of the package 2 which constitutes outer walls of the non gas compartment 4 as well as a blower inlet 21 of the air blower 16 opens into the non gas compartment 4, and an air outlet 22 of the condenser 19 is allowed to open into an exterior of the package 2.

The fuel cell body 6 is connected to the reformer 5 through hydrogen piping 23 and is also connected to the burner 10 through disused hydrogen piping 24 respectively within the gas path compartment 3. In addition, the fuel cell body 6 is connected to the air blower 16 and the condenser 19 through air piping 25 and disused air piping 26 respectively, the piping being passing through the partition wall 1.

A water supplying apparatus 18 is connected to the reformer 5 via water piping 17b which is passing through the partition wall 1.

In this case, a first compartment according to the present invention corresponds to the gas path compartment 3 and a second compartment according to the present invention corresponds to the non gas compartment 4. An inlet for the second compartment according to the present invention corresponds to the non gas compartment inlet 20, inlets for the first compartment according to the present invention correspond to the gas path compartment inlets 12a and 12b, and an outlet for the first compartment according to the present invention corresponds to the gas path compartment outlet 13.

Operation and the method of the above described fuel cell generation system will be described below.

The raw material gas such as methane supplied from the raw material gas piping 7 is heated by the burner 10 within the reformer 5 where the raw material gas is subjected to a reforming reaction to be converted to hydrogen, which is supplied to the fuel cell body 6 through the water piping 23.

On the other hand, air which fed by the air blower 16 is supplied to the fuel cell body 6 through the air piping 25, where hydrogen supplied and oxygen in the air are allowed to react with each other to generate electricity.

The remaining hydrogen which has not been used for the reaction (disused hydrogen) is supplied to the burner 10 through the disused hydrogen piping 24 and used as heating fuel for the reforming reaction.

The disused air containing water and steam produced by the reaction is led to the condenser 19 through the disused air piping 26 and is discharged from the air outlet 22 after separating water from the disused air. The water separated within the condenser 19 is supplied from the water supplying apparatus 18 through the water piping 17a and 17b to the reformer 5 and used as a material for the reforming reaction.

A series of these operations is conducted by the control unit 15. The raw material gas may be replaced with liquid fuel such as methanol.

At this time, an air flow is produced within the gas path compartment 3 because outside air is sucked from the gas path compartment inlets 12a, 12b and then discharged from the gas path compartment outlet 13 by the ventilation fan 14.

Therefore, in the event that the flammable gas such as raw material gas or hydrogen leaks out of a flammable gas flowing component such as the reformer 5 or the fuel cell body 6, the leaked flammable gas is immediately discharged out of the package 2, so that there is no danger of explosion or abnormal combustion due to the inflow of the flammable gas to the reformer 5 or fuel cell body 6. In addition, separation from the control unit 15 by the partition wall 1 brings no danger of ignition or explosion due to the sparks made by the control unit 15.

The control unit 15 requires to be cooled because the unit 15 is generally composed of heat-producing components and a heat-resisting temperature of a component such as a semiconductor device is low. The blower inlet 21 opens into the non gas compartment 4 according to Embodiment 1, so that air flows into the non gas compartment 4 from the non gas compartment inlet 20 and cools the control unit 15 before being sucked into the air blower 16.

The ventilation fan 14 has only to ventilate the gas path compartment 3 and does not need to ventilate the non gas compartment 4 because of the aforementioned cooling effect. Therefore, a capacity required for the ventilation can be decreased and electric power consumption can also be lowered to allow for preventing the generation efficiency of the fuel cell generation system from being decreased.

Embodiment 2

Embodiment 2 according to the present invention will now be described with reference to FIG. 1, as in the case of Embodiment 1.

This embodiment has basically the same configuration as Embodiment 1, so that this paragraph will describe the following matters in more detail.

This paragraph will omit the descriptions of the matters which have already been described in Embodiment 1.

In Embodiment 2, the gas path compartment outlet 13 is provided with the ventilation fan 14 and the gas path compartment inlets 12a and 12b are provided sufficiently away from the gas path compartment outlet 13. Specifically, as shown in FIG. 1, the gas path compartment inlets 12a and 12b are provided for the outer walls of package 2 at the underside of the reformer 5 and at the lateral position of the fuel cell body 6 respectively. That is, the reformer 5 and the fuel cell body 6 are placed between the gas path compartment outlet 13 (corresponding to an outlet for the first compartment in the present invention) and the inlets for gas path compartment 12a, 12b (corresponding to an inlets for the first compartment in the present invention).

Providing a plurality of the gas path compartment inlets 12a, 12b sufficiently away from the gas path compartment outlet 13, the outside air sucked from the gas path compartment inlets 12a, 12b uniformly flows through the gas path compartment 3 and is discharged from the gas path compartment outlet 13 by the ventilation fan 14. Therefore, even in the event that the flammable gas leaks out of the flammable gas flowing compartment, the leaked flammable gas can be more completely discharged out of the package 2.

Although this embodiment has described the fuel cell generation system provided with two inlets for the gas path compartment, the number of the inlets are not necessarily more than one and the number of the inlets may be one or may be three or more. Briefly speaking, the number of the inlets for the gas path compartment is not important as long as the outside air uniformly flows through the gas path compartment 3 and discharged from the gas path compartment outlet 13 by the ventilation fan 14.

Embodiment 3

Embodiment 3 according to the present invention will now be described with reference to FIG. 1, as in the case of Embodiments 1 and 2.

This embodiment has basically the same configuration as the above described embodiment, so that this paragraph will describe the following matters in more detail.

This paragraph will omit the descriptions of the matters which have already been described in the above mentioned embodiments.

In embodiment 3, the combustion fan inlet 8 which supplies air for the combustion to the burner 10 of the reformer 5 and the reformer outlet 11 for discharging the combustion gas open into an exterior of the package 2.

Opening the combustion fan inlet 8 into the exterior of the package 2, even in the event that the flammable gas leaks out of a flammable gas flowing component, the leaked flammable gas never flows into the burner 10 from the combustion fan inlet 8. So that an explosion or abnormal combustion can be prevented before it happens.

Embodiment 4

Embodiment 4 according to the present invention will now be described with reference to FIG. 1, as in the case of Embodiments 1 to 3.

This embodiment has basically the same configuration as the above described embodiment, so that this paragraph will describe the following matters in more detail.

This paragraph will omit the descriptions of the matters which have already been described in the above mentioned embodiments.

In Embodiment 4 which provides a flammable gas detector 27 in the vicinity of the ventilation fan 14, even in the event that the flammable gas leaks out of the flammable gas flowing component, a leakage of the flammable gas is instantaneously detected because air within the gas path compartment 3 is exhaustively flows into the ventilation fan 14 and discharged from the gas path compartment outlet 13. Therefore, measures for stopping the operations of the fuel cell generation system, for example, can be taken in order to provide a higher level of safety.

Although the above described embodiments have emphasized a configuration illustrated in FIG. 1, the present invention is not limited to such an configuration. For example, another first example of the fuel cell generation system according to the present invention may have a configuration comprising:

a first compartment and a second compartment provided by partitioning an interior of a package with a partition wall;

a reformer placed within the above described first compartment;

a fuel cell body placed within the above described first compartment;

a control unit for controlling the above describes reformer and/or the above described fuel cell body placed within the above described second compartment; and an air blower for supplying air to the above described fuel cell body placed within the above described second compartment, in which ventilation of the above described first compartment and ventilation of the above described second compartment are performed independently.

Further, another second example of the fuel cell generation system according to the present invention may have a configuration in which, in addition to the configuration of the above described another example, a predetermined part of a frame member of the above described package which constitutes an outer wall of the above described second compartment is provided with an inlet for the second compartment;

the above described frame member constituting the outer wall of the above described second compartment, other than the predetermined part where the above described inlet for the second compartment is provided, is provided with an outlet for discharging exhaust gas from the above described fuel cell body to an outside of the above described package; and an inlet of the above described air blower for blowing air opens into an interior of the above described second compartment.

Further, another third example according to the present invention may comprise the fuel cell generation system of the above described first example or the above described second example in which, a predetermined part of a frame member of the above described package constituting an outer wall of the above described first compartment is provided with an inlet for the first compartment and an outlet for the first compartment, and the above described outlet for the first compartment is provided with a ventilation fan.

Still further, for example, another fourth example according to the present invention may comprise the fuel cell generation system of the above described third example in which, the above described reformer and/or the above described fuel cell body are placed between the above described outlet for the first compartment and the above described inlet for the first compartment.

Still further, for example, another fifth example according to the present invention may comprise the fuel cell generation system of the above described third or fourth example in which, the above described reformer is provided with a burner, and a frame member constituting an outer wall of the above described first compartment, other than the above described predetermined part, is provided with (1) an inlet for a combustion fan for supplying air for combustion to the above described burner and (2) an outlet for the reformer for discharging the combustion gas from the above described reformer.

In addition, another sixth example according to the present invention may comprise the fuel cell generation system of the above described third, fourth, or fifth example in which a flammable gas detector for detecting flammable gas is provided in the vicinity of the above described ventilation fan.

Every fuel cell generation system of these examples, as in the case with the configuration of the above described embodiment, produces an effect of ensuring its safety without a possibility of an explosion or abnormal combustion as well as reducing electric power required for the ventilation and keeping its efficiency at higher level.

The present invention, even in the event that flammable gas leaks out of a flammable gas flowing component for example, has an effect of improving safety with a possibility of an explosion or abnormal combustion eliminated because the leaked flammable gas is immediately discharged out of a package.

The present invention also has an effect of decreasing a capacity required for ventilation and lowering electric power consumption to allow for preventing the generation efficiency of the fuel cell generation system from being decreased, for example.

The present invention also has an effect of preventing the explosion or abnormal combustion before it happens without an inflow of the flammable gas to a burner in the event that the flammable gas leaks out, for example.

In addition, for example, a measure for stopping an operation of the fuel cell generation system can be taken immediately after detecting the leakage of the flammable gas, so that the present invention also has an effect of further improving the safety.

What is claimed is:

1. A fuel cell generation system comprising:
    a first compartment and a second compartment provided by partitioning an interior of a package with a partition wall;
    a reformer placed within said first compartment;
    a burner placed within said first compartment;
    a fuel cell body placed within said first compartment;
    a disused hydrogen piping for supplying remaining hydrogen which has not been used by said fuel cell body to said burner, said disused hydrogen piping being placed within said first compartment;
    a control unit for controlling said reformer and/or said fuel cell body, said control unit being placed within said second compartment; and
    an air blower for supplying air to said fuel cell body, said air blower being placed within said second compartment,
    wherein ventilation of said first compartment and ventilation of said second compartment are performed independently.

2. The fuel cell generation system according to claim 1, wherein a predetermined part of a frame member of said package which constitutes an outer wall of said second compartment is provided with an inlet for said second compartment;
    said frame member constituting said outer wall of said second compartment, other than said predetermined part where said inlet for said second compartment is provided, is provided with an air outlet for discharging exhaust gas from said fuel cell body to an outside of said package; and
    an inlet of said air blower opens into an interior of said second compartment.

3. The fuel cell generation system according to claim 1, wherein a predetermined part of a frame member of said package constituting an outer wall of said first compartment is provided with an inlet for said first compartment and an outlet for said first compartment, and
    said outlet for said first compartment is provided with a ventilation fan.

4. The fuel cell generation system according to claim 3, wherein said reformer and/or said fuel cell body are placed between said outlet for said first compartment and said inlet for said first compartment.

5. A fuel cell generation system, comprising:

a first compartment and a second compartment provided by partitioning an interior of a package with a partition wall;

a reformer placed within said first compartment;

a fuel cell body placed within said first compartment;

a control unit for controlling said reformer and/or said fuel cell body, said control unit being placed within said second compartment; and an air blower for supplying air to said fuel cell body, said air blower being placed within said second compartment, wherein:

ventilation of said first compartment and ventilation of said second compartment are performed independently, a predetermined part of a frame member of said package constituting an outer wall of said first compartment is provided with an inlet for said first compartment and an outlet for said first compartment, said outlet for said first compartment is provided with a ventilation fan, said reformer is provided with a burner, and a frame member constituting an outer wall of said first compartment, other than said predetermined part, is provided with (1) an inlet for a combustion fan for supplying air for combustion to said burner and (2) an outlet for said reformer for discharging said combustion gas from said reformer.

6. The fuel cell generation system according to claim 3, wherein a flammable gas detector for detecting flammable gas is provided in said vicinity of said ventilation fan.

7. The fuel cell generation system according to claim 2, wherein a predetermined part of a frame member of said package constituting an outer wall of said first compartment is provided with an inlet for said first compartment and an outlet for said first compartment, and said outlet for said first compartment is provided with a ventilation fan.

* * * * *